(12) United States Patent
Smith et al.

(10) Patent No.: US 8,249,446 B2
(45) Date of Patent: Aug. 21, 2012

(54) METHOD AND APPARATUS FOR REGULATING ROGUE BEHAVIOR IN OPTICAL NETWORK TRANSMISSION DEVICES

(75) Inventors: Joseph L. Smith, Fuquay Varina, NC (US); David G. Eckard, Knightdale, NC (US)

(73) Assignee: Alcatel Lucent, Paris (FR)

( * ) Notice: Subject to any disclaimer, the term of this patent is extended or adjusted under 35 U.S.C. 154(b) by 254 days.

(21) Appl. No.: 12/649,606

(22) Filed: Dec. 30, 2009

(65) Prior Publication Data

US 2011/0033180 A1 Feb. 10, 2011

Related U.S. Application Data (60) Provisional application No. 61/273,702, filed on Aug. 7, 2009.

(51) Int. Cl.
*H04B 10/08* (2006.01)

(52) U.S. Cl. .............. 398/17; 398/25; 398/33

(58) Field of Classification Search .......... 398/1–2, 398/17, 33, 58, 70–71, 25
See application file for complete search history.

(56) References Cited

U.S. PATENT DOCUMENTS

2009/0123154 A1  5/2009  Dalton et al.

*Primary Examiner* — Dzung Tran
(74) *Attorney, Agent, or Firm* — Hitt Gaines, P.C.

(57) ABSTRACT

A method and apparatus for regulating rogue behavior in optical transmission devices. The apparatus, for example, may be implemented in one or more of the ONTs in a PON. The ONT includes an optical transmitter that may be disabled by a command generated by the ONT itself if rogue behavior is detected or suspected. To detect rogue behavior, at least one output indictor, such as LBC or MPC, is monitored during one or more monitoring windows. If monitoring indicates that the optical transmitter is transmitting more than a pre-determined threshold, a suspect rogue flag is set, for example in an I2C register. The register is read, preferably a number of successive times, and a determination is made whether to disable the optical transmitter. In some embodiments, the OLT is queried as part of this determination. The disability may be permanent, until a manual service operation, for example, or temporary.

19 Claims, 4 Drawing Sheets

METHOD AND APPARATUS FOR REGULATING ROGUE BEHAVIOR IN OPTICAL NETWORK TRANSMISSION DEVICES

CROSS-REFERENCE TO RELATED APPLICATIONS

The present disclosure is related to and claims priority from U.S. Provisional Patent Application Ser. No. 61/273,702, entitled Method and Apparatus for Regulating Rogue Behavior in Optical Network Transmission Devices, filed on Aug. 7, 2009, the entire contents of which are incorporated by reference herein.

TECHNICAL FIELD

The present invention relates generally to the field of optical communication networks, and, more particularly, to a method and apparatus for detecting rogue behavior in a PON optical network component, such as an ONT, and, if necessary, shutting down or otherwise altering the behavior of the rogue component.

BACKGROUND

The following abbreviations are herewith defined, at least some of which are referred to within the following description of the state-of-the-art and the present invention.
GPON gigabit (enabled) PON
I2C inter-integrated circuit
LBC laser bias current
LED light emitting diode
MDU multi-dwelling unit
MPC monitor photodiode current
OLT optical line termination
ONT optical network termination
PON passive optical network An increasing number of communications systems use optical transmission for carrying signals to transmit information. Optical networks may be used for both voice and data transmission, such as telephone service and Internet access, as well as for the transmission of television programs and other media. Optical networks use light produced by lasers or LEDs that is transmitted along fiber optic cables. Optical networks are high capacity and preferred in many applications. Although bundled fiber optic cables have for some time been used for high-capacity, long-distance transmissions, fiber to the home and fiber to the curb implementations are becoming more common as the infrastructure is built out.

A widely-used type of optical network is a PON. Herein, this term is meant to include the various evolutions of the PON, such as a GPON. In an exemplary PON, an OLT is connected by fiber optic cable to a number of ONTs. An OLT is frequently located in the network provider's switching office and may serve several dozen separate ONTs. The OLT receives information from content and service providers for transmission to the subscribers through their respective ONTs. Although in most cases this downstream traffic accounts for the majority of system transmission, each ONT also transmits information upstream to the OLT, which then can process and forward it on to its intended destination.

Note that as used herein, "ONT" is intended to refer broadly to all subscriber-based optical network components. Different ONTs may, for example, be associated with a particular residence, while others may be associated with apartment buildings and small businesses, and permit access for a number of separate subscribers. ONTs are typically demarcation points, terminating the provider's optical network at a subscriber's premises. From these ONTs, a connection is made to the subscriber's equipment, in many cases through a home network to which multiple devices have access.

Because there is more downstream transmission bandwidth available, each ONT is assigned time slots for upstream transmission, during which buffered information, if any, is sent as a burst during an available slot. Scheduling is normally done by the OLT. Time slots are tightly scheduled, however, to maximize the available transmission time. Precise calculations are made to ensure that each ONT transmits at the right time, including a process called ranging. In ranging, the PON goes through a procedure so that the OLT may discover each ONT to which it is actively connected, and gauge the physical distance separating it from the OLT. A delay associated with that distance is used to adjust the time slot for the respective ONT. As should be apparent, this timing is very important and ONTs that transmit at the wrong time may disrupt communications for the entire PON.

One problem encountered in this carefully-executed scenario is the rogue ONT. A rogue ONT is one that is currently over-transmitting, and therefore transmitting, at least part of the time, at the wrong times. This may occur, for example, because the optical transmitter in the ONT is stuck in an 'on' configuration, although a rogue ONT is not necessarily 'on' all of the time.

Although the remedy for a rogue ONT situation will often be to simply shut down the offending components, temporarily or until a repair or restart may be affected, there are often practical obstacles to doing so. First, the offending ONT must somehow be detected. The OLT will naturally be able to perceive in most cases that transmissions on the PON are not occurring normally. But since in this event a rogue ONT is likely transmitting at the wrong time, or disrupting the transmissions from the ONTs to the OLT, it may be difficult to identify the offending ONT. Therefore existing solutions that rely on communication between the OLT and one or more ONTs are often not satisfactory.

One possible scheme is to monitor the burst enable signal (related to the ONT's allocated timeslot) for an optical laser or other light source, but failures beyond this control point may leave the ONT open to additional faults that are not detectable in this manner. The monitoring of LBC is another possibility, but due to the burst nature of PON transmissions, the measurements taken in this case are in and of themselves less than satisfactory for detecting a rogue ONT.

Note that the techniques or schemes described herein as existing or possible are presented as background for the present invention, but no admission is made thereby that these techniques and schemes were heretofore commercialized or known to others besides the inventors.

Accordingly, there has been and still is a need to address the aforementioned shortcomings and other shortcomings associated with regulating rogue ONTs and other, similar, optical transmission components. These needs and other needs are satisfied by the present invention.

SUMMARY

The present invention is directed to a manner of regulating rogue behavior in optical transmission devices, preferably by the optical transmission device itself or at least in a way that minimizes the need for communications with other network components.

In one aspect, the present invention is a method of regulating rogue behavior in an optical network component having an optical transmitter. The method includes monitoring a selected optical transmitter output indicator during at least one monitoring window, determining whether an output threshold has been exceeded during the at least one monitoring window and, if so, setting a suspect rogue flag in a register. The method further includes reading the register to determine if the suspect rogue flag has been set. In a preferred embodiment, the method includes monitoring during a plurality of windows, setting the suspect rogue flag accordingly, and reading the register a plurality of times in succession. The method may further include determining whether to disable the optical transmitter based on the register reading or readings, and generating a command to disable the optical transmitter if required.

In a preferred embodiment, the optical network component is an ONT operational in a PON using a laser for the optical transmitter. In this preferred embodiment, the output indicator is preferably either the LBC or the MPC. The method may further include attempting to communicate with an OLT of the PON if a determination is made that a suspect rogue condition may exist. In this case, the ONT may send a network status request message to the OLT, and disable the optical transmitter if no reply is received or if the reply indicates networks problems exist. In the latter case, the ONT may, after some time has passed with the optical transmitter disabled, send a network status update query in an attempt to determine if the network conditions improved during this time. The optical transmitter may remain enabled if network conditions did not change when the optical transmitter was disabled.

In another aspect, the present invention is an apparatus for regulating rogue behavior in an optical transmission device, including an output indicator monitor, a register for storing a suspect rogue flag if the output indicator monitor detects that an output indicator threshold has been exceeded during a monitoring window, a reader for reading the register to determine whether a suspect rogue flag has been set, and a determiner for determining whether to disable the optical transmitter if a suspect rogue flag has been set.

In yet another aspect, the present invention is an ONT for use in a PON including a network interface comprising an optical transmitter and an optical receiver, a memory device comprising a register, an output indicator monitor for monitoring at least one output indicator of the optical transmitter, a reader for reading the register to determine whether a suspect rogue flag has been set by the output indicator monitor, and a determiner for determining whether to disable the optical transmitter if a suspect rogue flag has been set.

Additional aspects of the invention will be set forth, in part, in the detailed description, figures and any claims which follow, and in part will be derived from the detailed description, or can be learned by practice of the invention. It is to be understood that both the foregoing general description and the following detailed description are exemplary and explanatory only and are not restrictive of the invention as disclosed.

BRIEF DESCRIPTION OF THE DRAWINGS

A more complete understanding of the present invention may be obtained by reference to the following detailed description when taken in conjunction with the accompanying drawings wherein.

DETAILED DESCRIPTION

The present invention is directed to a manner of regulating rogue behavior in optical transmission devices. Typically these devices are included in the components that are intended to function in an optical communication network. The rogue behavior must be controlled because it is often if not always disruptive to network communications. As mentioned above, rogue behavior occurs when the light source, such as a laser or LED, is on for a significant amount of the available time, especially when it is operating at a time not assigned to it. Regulation of this rogue behavior includes the ability to detect and disable the optical transmitter, either for a period of time or permanently—permanently in this context meaning until the ONT can be re-initialized, sometimes manually, and preferably after the cause of the rogue behavior has been eliminated.

Figure 1:
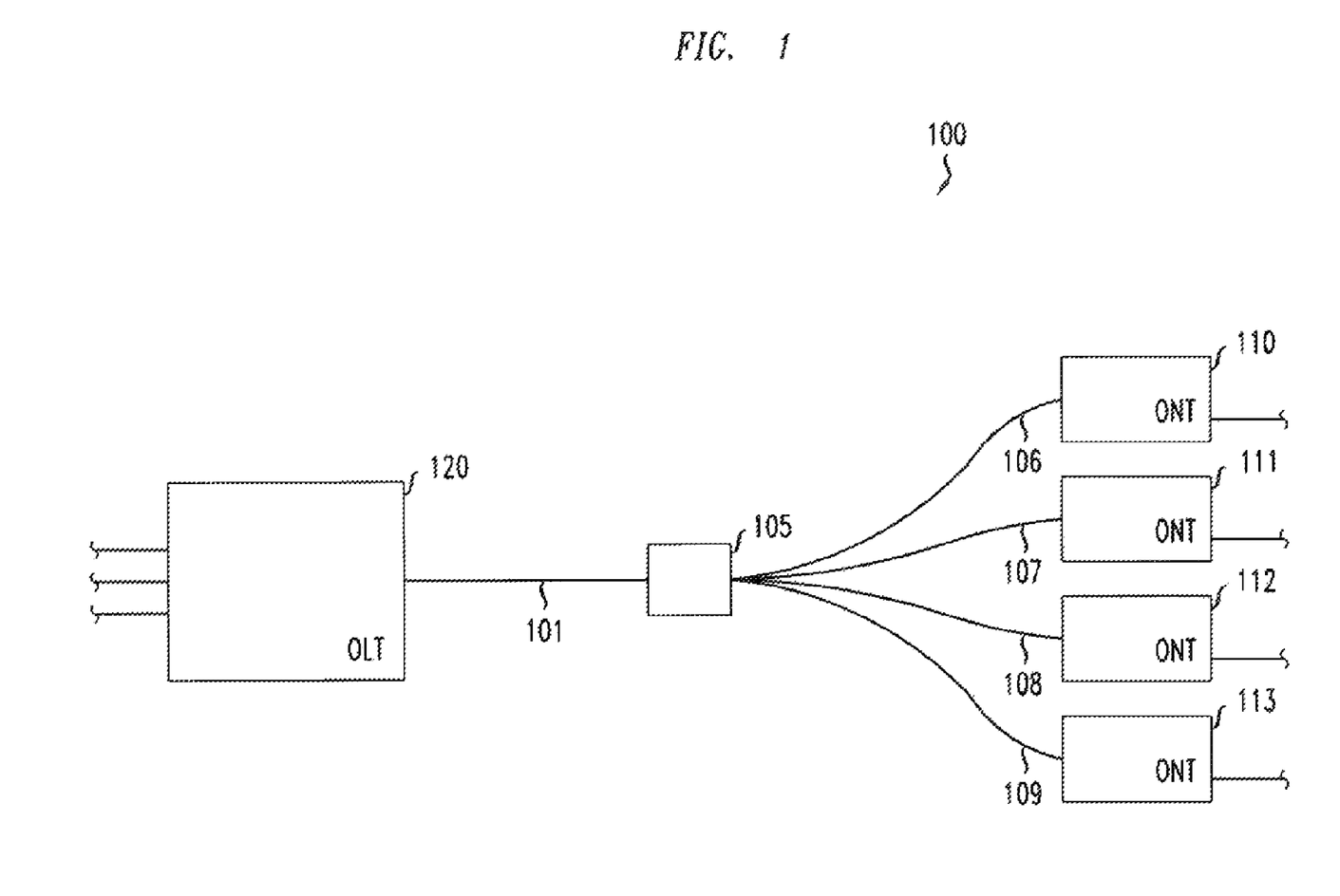
FIG. 1 is a schematic diagram illustrating selected components of a PON in which the present invention may be advantageously implemented.

The present invention will now be described in terms of detecting rogue behavior in an ONT operating within a PON. It should be recognized, however, that the present invention has applicability for use in other optical transmission devices and in other networks as well. Again, it is noted that herein the term "ONT" is meant to include all subscriber-based optical network components. The present invention is of particular advantage in PONs in part because of their widespread use. In addition the components in a PON are usually geographically widely-dispersed, and are often located on private property where they may be inconvenient to access. In these circumstances, regulation of a rogue ONT mostly or exclusively by the ONT itself is desirable FIG. 1 is a schematic diagram illustrating selected components of a PON 100 in which the present invention may be advantageously implemented. Note that PON 100 may, and in many implementations will, include additional components, and the configuration shown in FIG. 1 is intended to be exemplary rather than limiting. Four ONTs, 110 through 113, are shown, although in a typical PON there may be many more or, in some cases, fewer. In this illustration, each of the ONTs are presumed to be located at and serving a different subscriber, perhaps at their respective residences. The ONT at each location is connected or connectable to a device of the subscriber, or to a network of such devices (not shown).

PON 100 also includes an OLT 120, which communicates directly or indirectly with various sources of content and network-accessible services (not shown) that are of interest to the subscribers associated with ONTs 110 through 113. As should be apparent, OLT 120 handles the communications between these entities and the ONTs. OLT 120 may also be involved in regulating the PON and individual ONTs, although an object of the present invention is to leave much of this function in the respective ONTs themselves.

OLT 120 is in at least optical communication with each of the ONTs in the PON 100. In the embodiment of FIG. 1, OLT is connected with the ONTs 110 through 113 via a fiber optic cable 101 and fiber optic cables 106 through 109. In this PON, a single splitter 105 is used to separate out from a transmitted signal and ensure that each ONT receives the same downstream signal. In other optical networks, it may also separate the different wavelengths, if used, associated with each of the respective ONTs. The splitter in a PON is typically a passive element requiring no power. Note, however, that no particular network configuration is a requirement of the present invention unless explicitly stated or apparent from the context. As alluded to above, since scheduled upstream traffic can also be accommodated in PON 100, rogue behavior by one or more of the ONTs can be disruptive. An ONT for regulating rogue behavior will now be described in more detail.

Figure 2:
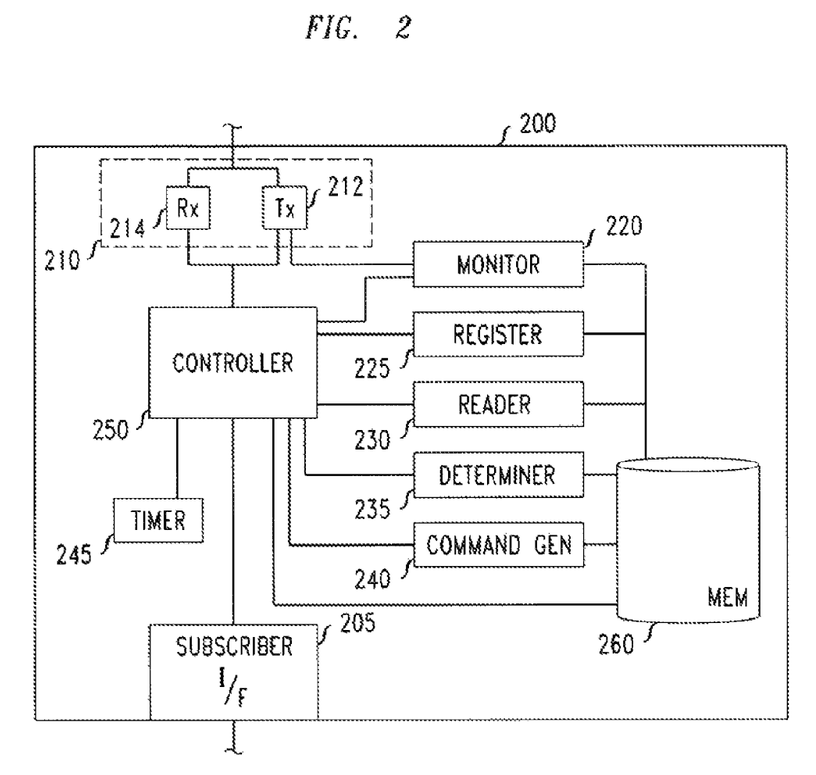
FIG. 2 is a simplified block diagram illustrating selected components of an ONT according to an embodiment of the present invention.

FIG. 2 is a simplified block diagram illustrating selected components of an ONT 200 according to an embodiment of the present invention. In this embodiment, ONT 200 includes a subscriber interface 205 for communicating with a device or network (not shown) belonging to, for example, a residential homeowner. ONT 200 also has a network interface 210 for communicating with a network, for example PON 100 shown in FIG. 1. In the embodiment of the FIG. 2, network interface 210 includes a transmitter 212 and receiver 214, for clarity shown separately, although they are often part of the same optics module.

The network interface 210 and subscriber interface operate under the control of controller 250, as does the memory device 260. Memory device 260 may be used for example, for storing operational instructions, identification information, and actual content that is being buffered.

In accordance with this embodiment of the present invention, ONT 200 also includes a monitor 220 for monitoring one or more output indicators of the transmitter 212. In this embodiment, the transmitter is presumed to include a laser, and an LBC is generated to assist in regulating its operation. Monitor 220 monitors the LBC, under the control of controller 250, for selected monitoring windows and, if the LBC indicates that the laser is 'on' for more than a predetermined percentage of the monitoring window duration, then controller 250 sets a suspect rogue flag in the register 225. Register 225 may store other information as well, and in a preferred embodiment it is the I2C register of ONT 200. Another output indicator that may be monitored is the MPC, with suspect rogue conditions flagged in register 225 in similar fashion. In some implementations more than one output indicator may be monitored, and the results of both used in setting suspect rogue flags, although this approach is not presently preferred.

Here it is noted that the other output indicator, if any, is something other than the burst enable signal itself, which may sometimes if not frequently be less successful when used in detecting rogue behavior. Note also that the term 'predetermined', as used herein, means that a threshold has been determined prior to the closing of a given window; this may be set in advance and seldom changed, or it may vary, that is, be redetermined, between one window and a later, subsequent window.

In the embodiment of FIG. 2, ONT 200 also includes a reader 230 for reading register 225 and, specifically, for determining whether a suspect rogue flag has been set. In a preferred embodiment, reader 230 makes a number of successive readings on a periodic basis. The results of these readings are stored in memory 260 and used by determiner 235. Determiner 235 uses the results of the readings to determine whether the optical transmitter 212 is exhibiting rogue behavior and should be disabled. Note that other factors besides the readings of the suspect rogue flag may be taken into account in making this determination, as described in more detail below. Command generator 240 generates a disable command when determiner 235 determines that the optical transmitter 212 should be disabled. In applicable embodiments, command generator 240 may also generate enable commands to enable optical transmitter 212, for example after a predetermined period of disability as determined by timer 245.

Note that these components of ONT 200 are shown separately for illustration; in other implementations they may be combined together or further divided. Register 225, for example, may also be considered a part of the memory device 260. In most cases, however, it is preferred that they are all resident on ONT 200 to minimize communications with other, physically separate network components in order to perform the method associated with the present invention. This method will now be described in more detail.

Figure 3:
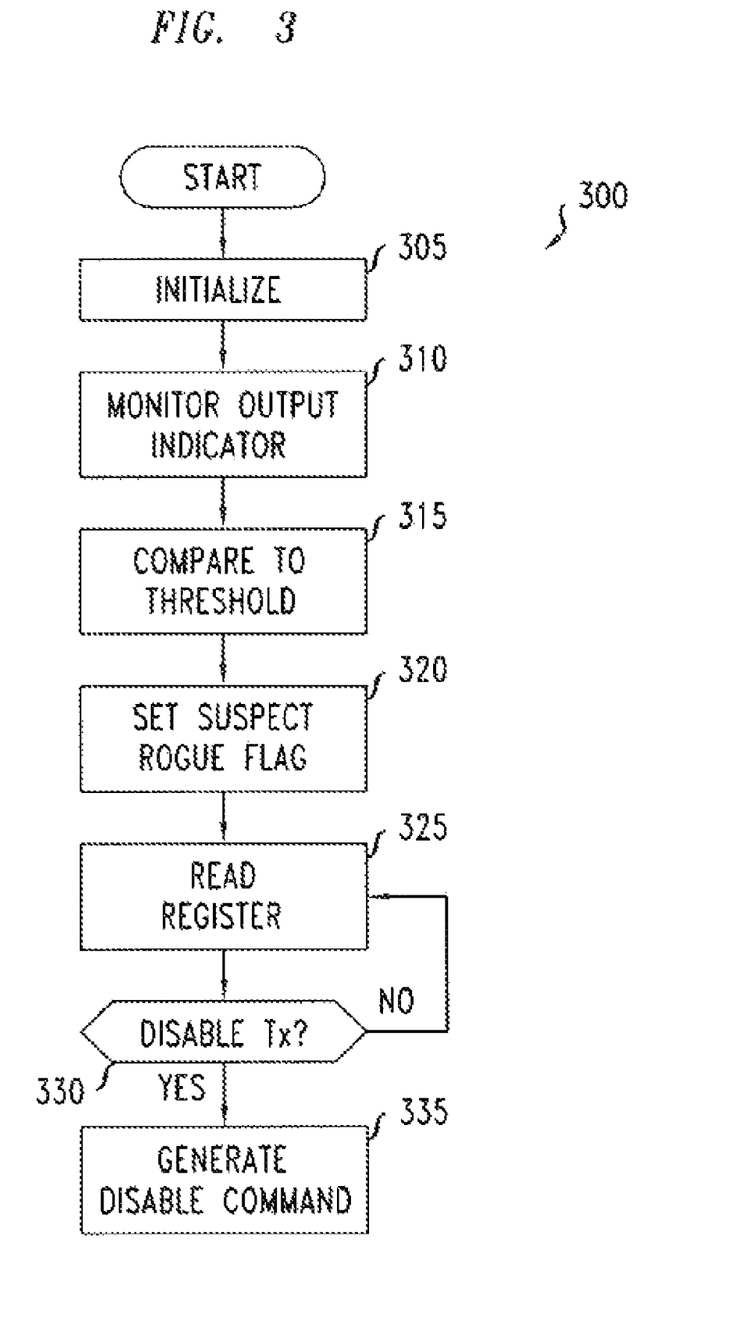
FIG. 3 is a flow diagram illustrating a method of regulating rogue behavior in an optical transmitter according to an embodiment of the present invention.

FIG. 3 is a flow diagram illustrating a method 300 of regulating rogue behavior in an optical transmitter according to an embodiment of the present invention. As above, this description will be presented largely in terms of an ONT operating within a PON or similar optical network, although the method is applicable to other devices and networks as well. At START, it is presumed that the components necessary to perform the method according to the present invention are available and operational. The process then begins when the ONT is initialized (step 305). This may simply signify powering up a network-connected device, but may also include any necessary startup routine that must be performed as a predicate to normal operation. In this embodiment, however, initialization 305 precedes but does not include the PON discovery and ranging process.

Once the device is initialized, one or more transmitter output indicators are monitored (step 310). As mentioned above, this indicator may be either an LBC or an MPC, or in some cases some other output indicator. In some embodiments, both may be used. Another output indicator may also be used instead, if is available, although using the LBC or MPC may be most available in existing types of devices and is presently preferred.

The monitoring 310 is performed for a specific time, which may be referred to as the monitoring window. The length of the monitoring window may vary from one implementation to another, and in some embodiments is set by the network operator, for example at device installation or remotely at the start of the discovery and ranging process. In other embodiments, the monitoring window is dynamically adjustable based on factors determined by the network operator. As an example, the monitoring window may be somewhere between 500 µs and 10 seconds, although other window durations outside this range may be used as well. Successive monitoring windows are usually to be of the same duration, unless adjusted, but in some cases different monitoring window sizes may by design be used in a series of monitoring operations.

In a preferred embodiment, the monitoring 310 is performed during ranging because then the amount of time that the light source is on is expected to be relatively small. Rogue behavior will be relatively easy to detect. Monitoring can also be performed at other times as well, however, as will be discussed in more detail below. In either case, the monitoring reveals, by tracking one or more of the output indicators, the time during the monitoring window that the light source is on. This can be expressed, for example as a percentage of the total window duration.

When the window closes, this percentage is compared (step 315) to a set threshold value, for example 50%, to see if the threshold has been exceeded. Note that here, 50% is used as an example; in other embodiments, the threshold may be set to almost any value. In some embodiments, this value may be changed remotely or automatically adjusted, or both. Note also that while the monitoring 310 and comparing 315 are for convenience represented as occurring once, in most implementations they will be repeated many times in succession. The ONT may but will not necessarily run this process continuously, although the size and frequency of the monitoring window may be varied from time to time (not shown).

When the comparison 315 has been performed, a flag is set (step 320) accordingly. If the threshold is exceeded, at step 320 a flag is set indicating that rogue behavior is suspected. For convenience this will be referred to as a suspect rogue flag, and, in a preferred embodiment, the suspect rogue flag is set in the I2C register of the optics module of the ONT. In this embodiment, if the suspect rogue flag is set and a subsequent monitoring step measures a value that does not exceed the threshold value, the suspect rogue flag may be un-set, or removed at step 320. Note that this removal of the suspect rogue flag may not be permitted in all embodiments; in which case once the flag has been set it remains set. In this regard note also that some transmitter activity is expected in normal operation, but the suspect rogue flag indicates activity exceeding a threshold. Whether the suspect rogue flag is removed subsequent to being set may depend in part on the length chosen for the monitoring window and frequency of monitoring. It may also depend on whether the ONT is ranging or regular operation, or upon experience-related factors. In some embodiments, for example, the flag may be un-set only if a certain number of successive monitoring windows have found no value exceeding the threshold.

In the embodiment of FIG. 3, the ONT reads the I2C register (step 325) periodically to see of the suspect rogue flag has been set. If so, the ONT determines (step 330) whether to disable the optical transmitter. This determination could be made, for example, simply if reading the I2C register reveals that the suspect rogue flag has been set. In a preferred embodiment, however, a number of successive reads are taken at step 320, and a disable determination made only after encountering a suspect rogue flag a certain number of times. In embodiments where the suspect rogue flag may be un-set under certain conditions, a certain number of successive reads may be required within in a predetermined time frame or number of reads.

As should be apparent, a network operator may want to adjust the monitoring window, suspect rogue flag setting threshold, and disable-determination criteria at the same time so that each value may take into consideration the others as well.

If a determination is made at step 325, then the ONT generates an optical transmitter disable command, for example by setting a disable flag in the I2C register. A determination may also be made at step 325 whether to temporarily or permanently disable the transmitter. If temporarily, the duration of the disability is decided upon and a timer is set for enablement (steps not shown). In one embodiment, however, the optical transmitter will simply be off until a service representative can repair or replace the ONT or verify that its operation is in fact correct. If a determination is made not to disable the transmitter (as will often be the case), then reading the register 325 simply continues according to the then-current schedule. In some embodiments, this schedule may also be varied from time to time.

In this manner, the present invention provides a way to regulate ONT behavior, and rogue behavior in particular, and do so autonomously.

Figure 4:
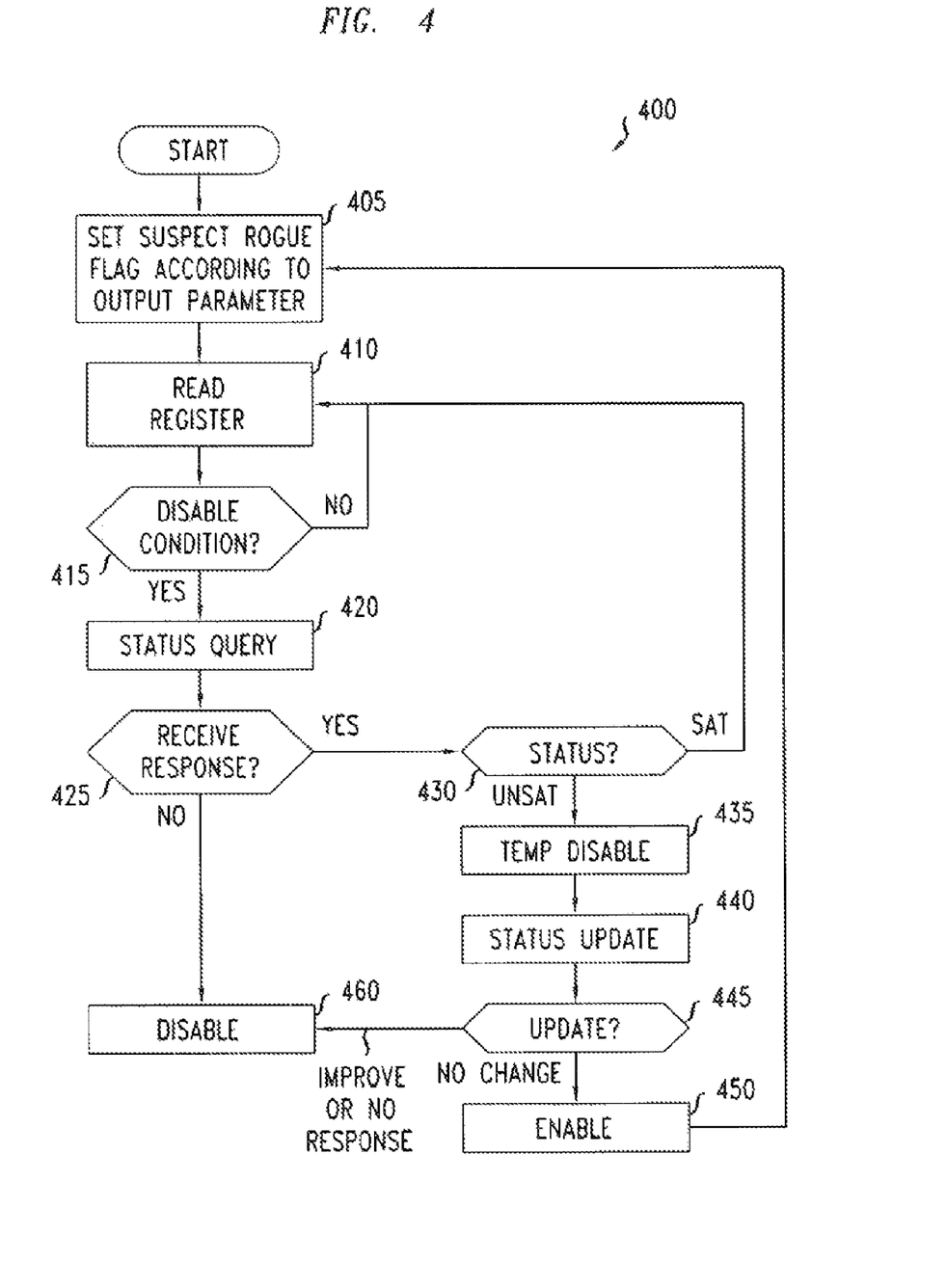
FIG. 4 is a flow diagram illustrating a method of regulating rogue behavior in an optical transmitter according to another embodiment of the present invention.

FIG. 4 is a flow diagram illustrating a method 400 of detecting rogue behavior in an optical transmitter according to an embodiment of the present invention. As with the embodiment of FIG. 3, this embodiment will be described in the context of an ONT operating in a PON, though other implementations are possible, and at START it is presumed that the components necessary to execution of the process are available and operational. Unlike the embodiment of FIG. 3, however, the embodiment of FIG. 4 will be more advantageously implemented after the ranging process has been completed and the ONT has begun regular operations. This preference, however, is not a requirement of either embodiment.

With this in mind, the embodiment of FIG. 4 begins with setting a suspect rogue flag according to indications provided by an output parameter (step 405). This may be accomplished, of course, as described above in reference to FIG. 3. In most embodiments, this will be the case, although in some embodiments another means of setting the suspect rogue flag may be used. Note that here, setting the suspect rogue flag includes removing or unsetting as warranted and permitted under whatever scheme is being implemented. The process then includes reading (step 410) the register in which the flag has been set. The process of reading the register is analogous to step 325 in method 300 shown in FIG. 3, although in the embodiment of FIG. 4, a different schedule for reading may be preferred. Note that when used herein, "reading the register" connotes examining a memory device to see if the suspect rogue flag has been set; no other structural or procedural limitations are implied, although they may be explicitly recited in some embodiments.

In the embodiment of FIG. 4, a determination is then made (step 415) as to whether a disable condition exists. Generally speaking, this step is analogous to the disable determination 330 of method 300. In the embodiment of method 400, if a determination is made that no disable condition exists, the process simply returns to continuing the operation of reading the register 410. In this embodiment, however, if a determination is made that a disable condition does exist, then a network status query is generated (step 420) and transmitted toward the OLT or other central network device. As should be apparent, this transmission may or may not be successful, depending on network conditions. It is possible, of course, that the ONT or other network component executing the method 400 may be contributing to any network problems that do exist. In any case, the ONT then determines whether a response to the network status query has been received (step 425).

In the embodiment of FIG. 4, if no response has been received, then a disable command is generated (step 460) in order to disable the optical transmitter. As with the embodiment of FIG. 3, this may be a permanent or temporary disable command. In this way, the possibly rogue ONT can be prevented from transmitting further, that is, its rogue behavior controlled, even if communication through the network is not currently possible. If the disable command generated at step 460 is temporary, a timer in the ONT can be set for the generation of an enable command (not shown) at a later time. It is possible that at this later time, whatever caused the rogue behavior (or, rather, the led to the detection of suspect rogue behavior) will have been alleviated. It is also possible that communication with the OLT will then be possible.

In this embodiment, if a response is received from the OLT at step 425, then the status of the network is determined (step 430) from the response (and possibly by considering other factors as well). If the OLT reports that PON performance is satisfactory, that is, that no perceivable problems exist, then the process returns to step 410 and register reading continues. If, on the other hand, the OLT reports unsatisfactory, that is, that network problems exist, then the ONT generates a command to disable the optical transmitter temporarily (step 435).

Here, it is noted that if the OLT perceives problems in the network, but knows their origin or at least perceives that they do not originate with the inquiring ONT, it may simply transmit a satisfactory response, and as a result the ONT will (proceeding through step 430) not disable the optical transmitter, at least not for this reason. In some implementations, the ONT may be configured to generate an optical transmitter disable command even if a satisfactory response is received, either based on certain other detectable conditions or the content of the OLT's "satisfactory" message.

In a preferred embodiment, the OLT provides additional information or instructions, rather than simply indicating that the network is unsatisfactory. It may, for example, indicate that the source of the network problems is presently unknown or otherwise provide an indication of what the problems might be. The OLT may also provide an indication of how long of a temporary disable should be executed. In some implementations, the OLT may also simply be able to cause the ONT to be disabled without further messaging. It may do so, for instance, based on network conditions and the network status inquiry received from the ONT.

In the embodiment of FIG. 4, at some point after the temporary disable command of step 435, the ONT generates and transmits a network status update query (step 440). Naturally, in most cases it must use the optical transmitter for this purpose, and so the transmitter will be enabled, perhaps but not necessarily for just enough time to deal with this communication. If no reply is received, or if the reply indicated that network conditions improved during the transmitter outage, then a disable command is generated (step 460). As should be apparent, this decision is based on the assumption that if network conditions improved when the ONT transmitter was not operational, the suspect rogue behavior is confirmed. It is noted, however, that in some cases a false confirmation may occur—that is, that in some circumstances a normally functioning transmitter may be disabled. For this reason, in some embodiments the temporary disable and status update query steps may be repeated one or more times before the transmitter is permanently disabled.

Finally, according to this embodiment if a network status update reply indicates that network conditions did not improve when the ONT disabled its transmitter, then the optical transmitter is enabled (step 450) and returns to normal operation, including the operations of setting the suspect rogue flag and reading the register to determine its status. Of course, in embodiments where the transmitter was enabled to send the network status update query and not subsequently disabled, this step simply allows the transmitter to remain enabled.

In this manner, the present invention provides a way to regulate ONT behavior, and rogue behavior in particular, and do so autonomously—though an attempt is made to communicate with the OLT and take advantage of any reply that is received.

Note that the sequences of operation illustrated herein are exemplary illustrations and not meant to exclude other embodiments. For example, the operations of the methods may be performed in any logically-consistent order. In addition, other steps may be added, or in some cases removed, without departing from the spirit of the invention.

Although multiple embodiments of the present invention have been illustrated in the accompanying Drawings and described in the foregoing Detailed Description, it should be understood that the present invention is not limited to the disclosed embodiments, but is capable of numerous rearrangements, modifications and substitutions without departing from the invention as set forth and defined by the following claims.

The invention claimed is:

1. A method of regulating rogue behavior in an optical network component comprising an optical transmitter, the method comprising:
monitoring a selected optical transmitter output indicator during at least one monitoring window;
determining whether an output threshold has been exceeded during the at least one monitoring window;
setting a suspect rogue flag in a register, if it is determined that an output threshold has been exceeded; and
removing the suspect rogue flag from the register if it is determined that the output threshold was not exceeded in a monitoring window occurring after the suspect rogue flag has been set.

2. The method according to claim 1, wherein reading the register comprises a plurality of successive readings, each to determine if the suspect rogue flag has been set.

3. The method according to claim 1, wherein the at least one monitoring window comprises a plurality of monitoring windows.

4. The method according to claim 1, further comprising determining whether to disable the optical transmitter.

5. The method according to claim 4, further comprising generating a command to disable the optical transmitter.

6. The method according to claim 4, wherein the optical network component is an ONT in a PON.

7. The method according to claim 6, further comprising attempting to transmit a PON status request message from the ONT to an OLT prior to determining whether to disable the optical transmitter.

8. The method according to claim 7, further comprising determining not to disable the optical transmitter if a reply to the status request message is received from the OLT indicating that the PON is functioning satisfactorily.

9. The method according to claim 7, further comprising generating a command to disable the optical transmitter if no response is received from the OLT within a predetermined period of time.

10. The method according to claim 7, further comprising, if a reply to the status request message is received from the OLT indicating that the PON is not functioning satisfactorily, transmitting a temporary disable message to the OLT and generating a command to temporarily disable the optical transmitter.

11. The method according to claim 10, further comprising generating a command to disable the optical transmitter, after expiration of a disable period generating a command to enable the optical transmitter, and attempting to transmit a PON status update request message to the OLT.

12. The method according to claim 1, wherein the optical transmitter comprises a laser and the selected optical transmitter output indicator is the LBC.

13. The method according to claim 1, wherein the optical transmitter comprises a monitor photodiode and the selected transmitter output indicator is the MPC.

14. The apparatus according to claim 1, further comprising reading the register, by the optical network component, to determine if the suspect rogue flag is set.

15. Apparatus for regulating rogue behavior in an optical transmission device, comprising:
an output indicator monitor;
a register for storing a suspect rogue flag if the output indicator monitor detects that an output indicator threshold has been exceeded during a monitoring window;
a reader for reading the register to determine whether a suspect rogue flag has been set; and
a determiner for determining whether to disable the optical transmitter if a suspect rogue flag has been set; and a timer for timing the duration between a temporary disable command and an enable command.

16. The apparatus according to claim 15, further comprising a command generator for generating optical transmitter disable commands.

17. The apparatus according to claim 15, further comprising an optical transmitter comprising a laser, and wherein the output indicator monitor monitors a laser bias current.

18. The apparatus according to claim 15, wherein the output indicator monitor monitors a monitor photodiode current.

19. An ONT for use in a PON, the ONT comprising:
a network interface comprising an optical transmitter and an optical receiver;
a memory device comprising a register;
an output indicator monitor for monitoring at least one output indicator of the optical transmitter;
a reader for reading the register to determine whether a suspect rogue flag has been set by the output indicator monitor; and
a determiner for determining whether to disable the optical transmitter if a suspect rogue flag has been set, and
a timer for timing the duration between a temporary disable command and an enable command.

* * * * *